Nov. 18, 1958   J. F. KALAT   2,860,947
METHOD OF CASTING PHENOLIC RESINS IN A TIN-PLATED MOLD
Filed June 14, 1954
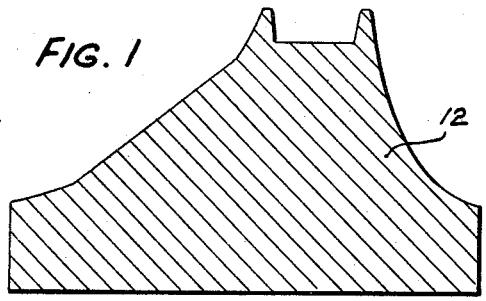
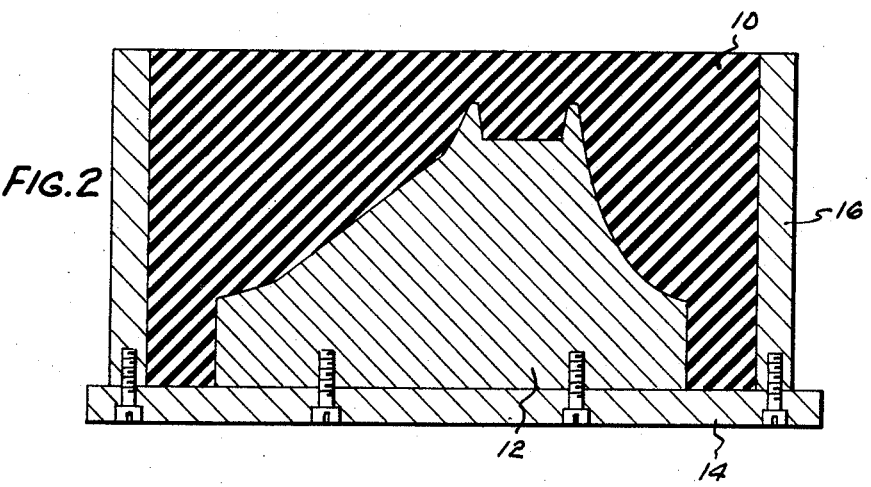
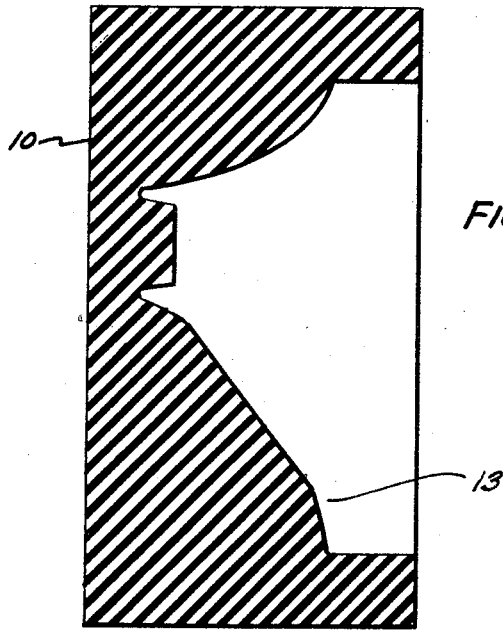
INVENTOR
J. F. KALAT
BY C. B. Hamilton
ATTORNEY

United States Patent Office 2,860,947
Patented Nov. 18, 1958

2,860,947

METHOD OF CASTING PHENOLIC RESINS IN A TIN-PLATED MOLD

Joseph F. Kalat, Chicago, Ill., assignor to Western Electric Company, Incorporated, New York, N. Y., a corporation of New York Application June 14, 1954, Serial No. 436,311

1 Claim. (Cl. 18—47)

This invention relates to the use of tin plated master molds for casting thermosetting phenolic casting resin.

Casting resins of the class of non-shrinking thermosetting phenolic resins hardened by the use of catalysts have been used for molding around a master part or in the cavity of a master mold to provide a relatively hard plastic casting which may be used for various purposes such as dies, jigs, fixtures, duplicating patterns, and the like. For precision work it is essential that the master parts or molds be finished to precise dimensions with very small tolerances in order that the plastic dies, duplicating patterns, etc., cast therefrom shall be precision products. In order to obtain a master of high quality, the master is made from steel. However, the application of the phenolic casting resin compound to steel causes a chemical reaction between the steel and the resin, resulting in the formation of unsatisfactory rough surfaces in the plastic casting molded therefrom.

An object of the present invention is to produce a steel mold for use in casting phenolic resin and having a metal plating thereon for producing a smooth casting held to very close tolerances.

Another object of the invention is to produce a metal mold for use with thermosetting phenolic casting resins and having molding surfaces of tin that do not require coatings of lacquer and other substances to produce satisfactory plastic castings.

Another object of the invention is to provide a method of making a duplicating pattern of a steel master from casting resins of thermosetting phenolic casting resins.

A method illustrating certain features of the invention as applied to the making of a plastic duplicating pattern from a thermosetting phenolic casting resin and a steel master mold may include the steps of tin plating the forming surfaces of the steel mold, mixing the ingredients of the thermosetting phenolic casting resin and applying the resin to the mold to form the pattern, heating the mold and the resin to polymerize the resin, and cooling and removing the master plastic pattern from the mold.

Other objects and advantages of the invention will become apparent by reference to the following detailed description and the accompanying drawings illustrating a preferred embodiment thereof, in which Fig. 1 is a diagrammatic view of a steel master from which a duplicating plastic pattern is to be made;

Fig. 2 is a diagrammatic view of a mold including the master with a casting resin applied thereto; and Fig. 3 is a sectional view of the cast plastic duplicating pattern.

The embodiment of the invention disclosed herein relates to the fabrication of a plastic duplicating pattern 10 from a steel master or part 12. The duplicating pattern may be set up in a Keller duplicating machine and used as a master pattern from which one or more steel molding die components may be fabricated. The master 12, which, as shown herein, represents the base of a telephone handset, is made from steel and is carefully finished to the desired shape and held to precise dimensions. The master 12 is secured to a plate 14, to which a rectangular wall structure 16 is also secured to form an open mold 18 into which the resin in liquid form may be poured to form the master pattern 10.

A casting resin made from a class of thermosetting phenolic resins hardened by the use of catalysts and characterized by a very low shrinkage during polymerization has been found to be suitable and to possess the required strength. However, it has been found that when this type of phenolic resin compounds are used with a steel master that the molded surfaces of the resin casting which contact the steel master are porous. The use of coats of parting lacquer or waxes destroy the precise dimensions and are not satisfactory. It has been found that by the application of a thin plating of tin of a thickness as little as .0001" to .0002" to the master permits it to be held to very close dimensions and produces non-sticking cast patterns of hard smooth texture. The steel master 12 and the interior of the mold may have a relatively thin coating of tin applied thereto by electroplating or by other means. The ingredients of the thermosetting phenolic resin are then mixed and poured into the mold 18 to cover the master 12. The mold 18 and the casting resin therein are then heated to a temperature of about 180° and left overnight to effect the polymerization of the resin. After the resin has been cured and cooled the mold 18 may be removed therefrom, leaving the duplicating pattern 10 with a cavity 13, the walls of which are very smooth and hard and which conform precisely to the outline of the outer surface of the master 12. The master 12 and the mold 18 may be used many times without further replating of the master so that in the event that the initial casting is imperfect, as from air bubbles or the like, other plastic castings may be made therefrom.

While in the embodiment disclosed herein the master 12 is in the form of a core for forming a master pattern of a female molding die, it will be understood that the master may be made in any form and that a master pattern may be cast therefrom by following the above-described method. Excellent results are obtained by this method with the use of non-shrinking casting resins of the well known class of thermosetting phenolic casting resins hardened by the use of a catalyst, a compound forming a typical example of which includes:

| | Lbs. |
|---|---|
| Phenol | 940 |
| Formalin (30%) | 100 |
| Sodium hydroxide | 3 |

These materials are mixed and prepared by well known methods and the product is hardened at room temperature by the addition of 10–15% by weight of hydrochloric or dilute sulphuric acid (10%). By heating the resin to a temperature of 180° F. during curing, a much harder casting is obtained.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

A method of molding in an open steel mold thermosetting phenolic non-shrinking casting resins hardened by the use of an acid catalyst which comprises tin plating the steel mold, mixing the ingredients of the resin and pouring the mixture into the mold, heating the mold and the mixture therein to polymerize the resin, and removing the casting from the mold.

(References on following page)

References Cited in the file of this patent

UNITED STATES PATENTS

| | | |
|---|---|---|
| Re. 13,988 | Eggers | Sept. 28, 1915 |
| 1,135,962 | Aylsworth | Apr. 13, 1915 |
| 1,359,919 | Reardon | Nov. 23, 1920 |
| 2,472,492 | Saffir | June 7, 1949 |

OTHER REFERENCES

Dewar: "Nonferrous Metals in Plastics Mold Construction," Tool and Die Journal, December 1942, pp. 116–118.

Plastic and Resins Industry, August 1944, p. 23.